US00RE48678E

(19) United States
(12) Reissued Patent
Su et al.

(10) Patent Number: US RE48,678 E
(45) Date of Reissued Patent: Aug. 10, 2021

(54) DISPLAY AND OPERATING METHOD THEREOF

(71) Applicant: HIMAX TECHNOLOGIES LIMITED, Tainan (TW)

(72) Inventors: Hsin-Chia Su, Kaohsiung (TW); Jia-Hao Wu, Tainan (TW); Chuan-Che Lee, Tainan (TW)

(73) Assignee: HIMAX TECHNOLOGIES LIMITED, Tainan (TW)

(21) Appl. No.: 15/641,225

(22) Filed: Jul. 4, 2017

Related U.S. Patent Documents

Reissue of:
(64) Patent No.: 9,076,398
Issued: Jul. 7, 2015
Appl. No.: 13/267,325
Filed: Oct. 6, 2011

(51) Int. Cl.
*G09G 5/10* (2006.01)
*G09G 3/36* (2006.01)
*G09G 3/20* (2006.01)

(52) U.S. Cl.
CPC ..... *G09G 3/3611* (2013.01); *G09G 3/2092* (2013.01); *G09G 2310/08* (2013.01); *G09G 2370/08* (2013.01); *G09G 2370/14* (2013.01)

(58) Field of Classification Search
CPC ..... G09G 3/2029; G09G 3/3611; G09G 2310/08; G09G 2370/08; G09G 2370/14
USPC ..... 345/98
See application file for complete search history.

(56) References Cited

U.S. PATENT DOCUMENTS 6,448,815 B1 * 9/2002 Talbot et al. ..... 326/86
7,453,283 B2 * 11/2008 Whetsel ..... H03K 19/01759 326/30
7,595,661 B2 * 9/2009 Kim ..... 326/82
7,609,097 B2 * 10/2009 Leonowich et al. ..... 327/108
7,705,841 B2 * 4/2010 Lin ..... G09G 3/3685 345/208
7,893,791 B2 * 2/2011 Ma ..... H01P 1/15 333/104
8,330,699 B2 * 12/2012 Hong ..... G09G 3/3648 345/99
8,878,792 B2 * 11/2014 Lim ..... H03L 7/0816 345/173

(Continued)

FOREIGN PATENT DOCUMENTS

TW 200705357 2/2007
TW I306236 2/2009

*Primary Examiner* — Henry N Tran
(74) *Attorney, Agent, or Firm* — JCIPRNET

(57) ABSTRACT

A display and an operating method thereof are provided. The display includes a display panel, a timing controller, and a plurality of source drivers. The timing controller has a plurality of signal output terminals. The source drivers are coupled to the timing controller and the display panel. The timing controller outputs a plurality of training packets to the source drivers. When the source drivers lock a clock of the timing controller according to the training packets, the timing controller outputs a plurality of control packets and a plurality of color data packets to the source drivers. The source drivers respectively output a plurality of pixel voltages corresponding to the color data packets to the display panel according to the corresponding control packets. The training packets, the control packets, and the color data packets are serially transmitted to the source drivers via the signal output terminals.

20 Claims, 9 Drawing Sheets

200

(56) References Cited

U.S. PATENT DOCUMENTS

| | | | | |
|---|---|---|---|---|
| 9,053,673 | B2 * | 6/2015 | Yuan | G09G 3/3611 |
| 2003/0160753 | A1 * | 8/2003 | McCartney | 345/99 |
| 2005/0088428 | A1 * | 4/2005 | Liu et al. | 345/204 |
| 2005/0088431 | A1 * | 4/2005 | Liu et al. | 345/204 |
| 2005/0168420 | A1 * | 8/2005 | Chung | 345/87 |
| 2006/0202937 | A1 * | 9/2006 | Chen et al. | 345/100 |
| 2007/0103205 | A1 * | 5/2007 | Whetsel | 327/108 |
| 2009/0058835 | A1 * | 3/2009 | Chen et al. | 345/204 |
| 2009/0189880 | A1 * | 7/2009 | Li et al. | 345/205 |
| 2009/0245345 | A1 * | 10/2009 | Lee et al. | 375/240.01 |
| 2010/0085084 | A1 * | 4/2010 | Kim et al. | 327/108 |
| 2010/0097119 | A1 * | 4/2010 | Ma et al. | 327/427 |
| 2010/0148829 | A1 * | 6/2010 | Hong et al. | 327/108 |
| 2010/0156879 | A1 * | 6/2010 | Hong et al. | 345/213 |
| 2010/0225637 | A1 * | 9/2010 | Jeon et al. | 345/213 |
| 2011/0037758 | A1 * | 2/2011 | Lim et al. | 345/213 |
| 2011/0227641 | A1 * | 9/2011 | Weiss et al. | 327/595 |
| 2011/0292024 | A1 * | 12/2011 | Baek et al. | 345/212 |
| 2012/0242628 | A1 * | 9/2012 | Yuan et al. | 345/204 |
| 2013/0050298 | A1 * | 2/2013 | Su et al. | 345/691 |
| 2013/0050302 | A1 * | 2/2013 | Su et al. | 345/691 |
| 2013/0088531 | A1 * | 4/2013 | Su et al. | 345/691 |

* cited by examiner

DISPLAY AND OPERATING METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a Reissue Application of U.S. Pat. No. 9,076,398 issued on Jul. 7, 2015, application Ser. No. 13/267,325, filed on Oct. 6, 2011. The entirety of the above-mentioned patent application is hereby incorporated by reference herein and made a part of this specification.*

BACKGROUND OF THE INVENTION

1. Field of the Invention

The invention relates to a display. More particularly, the invention relates to a display in which a timing controller serially transmits data and an operating method of the display.

2. Description of the Related Art

A flat display apparatus, e.g., a thin film transistor liquid crystal display (TFT-LCD), has replaced the conventional cathode ray tube (CRT) display apparatus. Compared to the conventional CRT display, the TFT-LCD display is characterized by various advantages, such as low operating voltage, low power consumption, small volume, small thickness, light weight, etc.

In general, a timing controller and source drivers in a display transmit control data and color data in parallel. The parallel data transmission contributes to reduction of transmission time, while the number of pins for outputting and receiving signals is increased. Therefore, a printed circuit board (PCB) equipped with both the timing controller and the source drivers has more wires, and the circuit of the PCB is complicated. Since the number of pins cannot be decreased, the chip area cannot be reduced, and thus the hardware costs of the timing controller and the source drivers cannot be lowered down.

SUMMARY OF THE INVENTION

The invention is directed to a display and an operating method thereof. The display has a timing controller and source drivers that are synchronously operated in no need of clock signals. Thereby, the hardware costs of the timing controller and the source drivers can be lowered down.

In an embodiment of the invention, a display that includes a display panel, a timing controller, and a plurality of source drivers is provided. The timing controller has a plurality of signal output terminals. The source drivers are coupled to the timing controller and the display panel. The timing controller outputs a plurality of training packets to the source drivers. When the source drivers lock a clock of the timing controller according to the training packets, the timing controller outputs a plurality of control packets and a plurality of color data packets. The source drivers respectively output a plurality of pixel voltages corresponding to the color data packets to the display panel according to the corresponding control packets. The training packets, the control packets, and the color data packets are serially transmitted to the source drivers through the signal output terminals.

According to an embodiment of the invention, the training packets, the color data packets, and the control packets are respectively transmitted by a differential signal.

According to an embodiment of the invention, the differential signal is output through a first signal output terminal and a second signal output terminal of the signal output terminals. Each of the source drivers includes a first switch and a second switch. A first end of the first switch is coupled to the first signal output terminal, a second end of the first switch is coupled to a predetermined voltage, and a control end of the first switch receives a lock signal. A first end of the second switch is coupled to the second signal output terminal, a second end of the second switch is coupled to the predetermined voltage, and a control end of the second switch receives the lock signal. The lock signal is enabled when the clock of the timing controller is not locked, and the lock signal is disabled when the clock of the timing controller is locked.

According to an embodiment of the invention, the timing controller detects a common mode voltage of the differential signal. When the common mode voltage is the predetermined voltage, the timing controller determines that a voltage level of the first signal output terminal and a voltage level of the second signal output terminal are pulled down to the predetermined voltage.

According to an embodiment of the invention, the timing controller detects a first current and a second current at the first signal output terminal and the second signal output terminal. When one of the first current and the second current is zero, the timing controller determines that a voltage level of the first signal output terminal and a voltage level of the second signal output terminal are pulled down to the predetermined voltage.

According to an embodiment of the invention, the timing controller detects a third current that is output to a ground point by a differential signal generating circuit which outputs the differential signal. When the third current is zero, the timing controller determines that a voltage level of the first signal output terminal and a voltage level of the second signal output terminal are pulled down to the predetermined voltage.

According to an embodiment of the invention, each of the control packets includes two start bits, two end bits, and a control code that is located between the start bits and the end bits.

According to an embodiment of the invention, each of the color data packets includes two start bits, two end bits, and a color data code that is located between the start bits and the end bits.

According to an embodiment of the invention, the color data code corresponds to two of red color data, green color data, and blue color data.

According to an embodiment of the invention, the color data code corresponds to one of red color data, green color data, and blue color data.

According to an embodiment of the invention, the start bits respectively correspond to a logic high level, and the end bits respectively corresponds to a logic low level.

According to an embodiment of the invention, each of the training packets includes two start bits, two end bits, a first clock code, and a second clock code. The first clock code is located between the start bits and the second clock code, and the second clock code is located between the first clock code and the end bits.

According to an embodiment of the invention, the start bits and a plurality of bits of the first clock code respectively correspond to a logic high level, and the end bits and a plurality of bits of the second clock code respectively correspond to a logic low level.

According to an embodiment of the invention, the source drivers lock the clock of the timing controller based on phase comparison.

In an embodiment of the invention, an operating method of a display is provided. The display includes a display panel, a timing controller, and a plurality of source drivers. The operating method of the display includes following steps. The timing controller outputs a plurality of training packets to the source drivers. When the source drivers lock a clock of the timing controller according to the training packets, the timing controller outputs a plurality of control packets and a plurality of color data packets to the source drivers. The source drivers respectively output a plurality of pixel voltages corresponding to the color data packets according to the control packets. The training packets, the control packets, and the color data packets are serially transmitted to the source drivers.

According to an embodiment of the invention, the source drivers respectively output a clock lock signal to the timing controller when the source drivers lock the clock of the timing controller.

According to an embodiment of the invention, when the clock of the timing controller is not locked, each of the source drivers pulls down a voltage level of a corresponding signal output terminal to a predetermined voltage for a first period of time, and the predetermined voltage is lower than a threshold voltage.

According to an embodiment of the invention, the first period of time is greater than or substantially equal to 350 nano-seconds.

According to an embodiment of the invention, the predetermined voltage is a ground voltage.

According to an embodiment of the invention, the timing controller outputs the training packets to the source drivers for a second period of time when one of the source drivers does not lock the clock of the timing controller.

According to an embodiment of the invention, the second period of time is greater than or substantially equal to 1500 times a packet time, and the packet time is a time period required for transmitting each of the training packets, each of the control packets, or each of the color data packets.

Based on the above, in the display and the operating method thereof described in the embodiments of the invention, operations of the timing controller and the source drivers can be synchronized due to the training packets. Hence, the timing controller and the source drivers are synchronously operated in no need of the clock signals, and thus the hardware costs of the timing controller and the source drivers can be lowered down.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
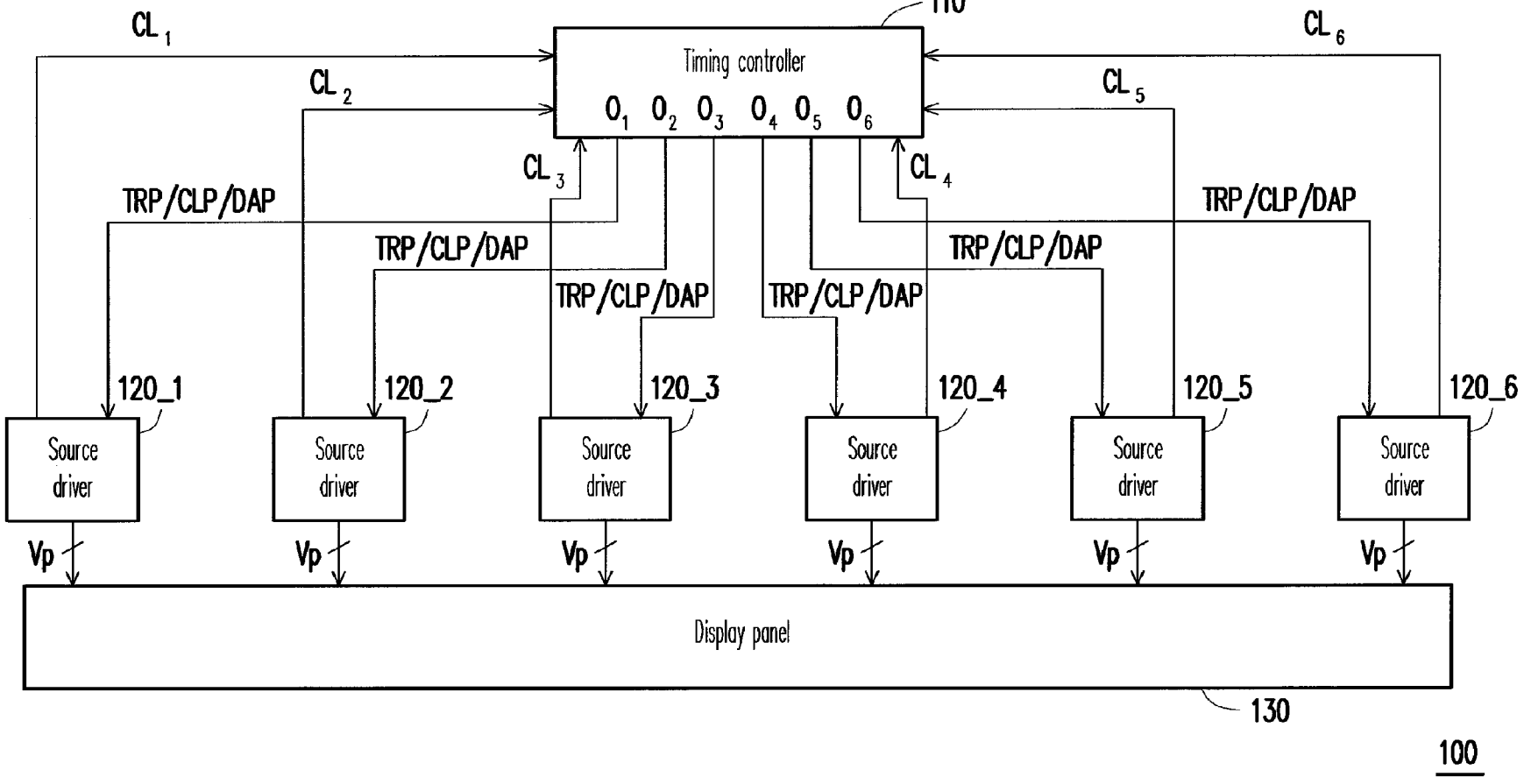
FIG. 1 is a schematic view illustrating a system of a display according to an embodiment of the invention.

FIG. 1 is a schematic view illustrating a system of a display according to an embodiment of the invention. With reference to FIG. 1, in this embodiment, the display 100 includes a timing controller 110, a plurality of source drivers, and a display panel 130. In FIG. 1, six source drivers 120_1~120_6 are exemplarily shown. The timing controller 110 has a plurality of signal output terminals. In FIG. 1, six signal output terminals $O_1$~$O_6$ are exemplarily shown. The timing controller 110 is coupled to the source drivers 120_1~120_6, so as to respectively output a plurality of training packets TRP, a plurality of control packets CLP or a plurality of color data packets DAP to the source drivers 120_1~120_6 respectively via the signal output terminals $O_1$~$O_6$. The source drivers 120_1~120_6 are coupled to the display panel 130, so as to respectively output a plurality of pixel voltages Vp to the display panel 130.

In this embodiment, the training packets TRP, the control packets CLP, and the color data packets DAP are serially transmitted by a differential signal. Based on the circuit design of the timing controller 110 and the source drivers 120_1~120_6, the timing controller 110 can transmit the training packets TRP, the control packets CLP, and the color data packets DAP to the corresponding source drivers (e.g., the source drivers 120_1~120_6) via one set of differential signal lines or two sets of differential signal lines. Namely, each of the signal output terminals (e.g., the signal output terminals $O_1$~$O_6$) can in fact include two or four signal output terminals, which should not be construed as a limitation to the invention.

When the source drivers 120_1~120_6 receive the training packets TRP, the source drivers 120_1~120_6 respectively lock the timing of the training packets TRP (equal to locking a clock of the timing controller 110 based on the training packets TRP) received by the source drivers 120_1~120_6. Here, the source drivers 120_1~120_6 lock the clock of the timing controller 110 based on phase comparison. When the source drivers 120_1~120_6 respectively lock the clock of the timing controller 110, the source drivers 120_1~120_6 respectively output clock lock signals $CL_1$~$CL_6$ to the timing controller 110, so as to inform the timing controller 110 of the fact that the source drivers 120_1~120_6 lock or do not lock the clock of the timing controller 110.

When the timing controller 110 receives the clock lock signals $CL_1$~$CL_6$, the timing controller 110 outputs the control packets CLP and the color data packets DAP to the source drivers 120_1~120_6 based on the clock lock signals $CL_1$~$CL_6$. The source drivers 120_1~120_6 respectively output the pixel voltages Vp to the display panel 130 based on the control packets CLP and the color data packets DAP received by the source drivers 120_1~120_6.

Figure 2:
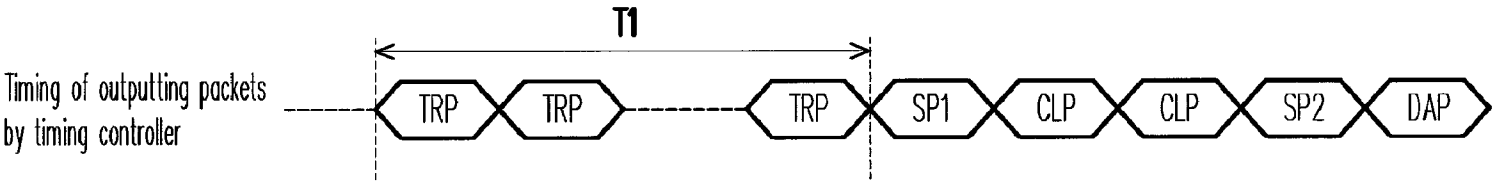
FIG. 2 is a schematic timing diagram illustrating that the timing controller of the display depicted in FIG. 1 outputs packets according to an embodiment of the invention.

FIG. 2 is a schematic timing diagram illustrating that the timing controller of the display depicted in FIG. 1 outputs packets according to an embodiment of the invention. With reference to FIG. 1 and FIG. 2, after the source drivers 120_1~120_6 lock the clock of the timing controller 110, the source drivers 120_1~120_6 can accurately receive the data packets (i.e., the control packets CLP and the color data packets DAP) transmitted by the timing controller 110. Hence, when the source drivers 120_1~120_6 do not lock the clock of the timing controller 110 (i.e., in the period T1), the timing controller 110 transmits the training packets TRP to the source drivers 120_1~120_6, such that the source drivers 120_1~120_6 can lock the clock of the timing controller 110 based on the training packets TRP. To be more specific, the number of the training packets TRP transmitted during the period T1 is determined based on the time at which the timing controller 110 receives the clock lock signals $CL_1$~$CL_6$. Namely, the period T1 is determined based on the time at which the timing controller 110 receives the clock lock signals $CL_1$~$CL_6$.

After the source drivers 120_1~120_6 lock the clock of the timing controller 110, the timing controller 110 transmits a first start signal packet SP1 to the source drivers 120_1~120_6, so as to inform the source drivers 120_1~120_6 of starting transmission of the control packets CLP. After the source drivers 120_1~120_6 received the control packets, the timing controller 110 transmits a second start signal packet SP2 to the source drivers 120_1~120_6, so as to inform the source drivers 120_1~120_6 of starting transmission of the color data packets. The timing controller 110 then outputs the control packets CLP to the source drivers 120_1~120_6, so as to determine the operational mode or the parameters of the source drivers 120_1~120_6. In other words, the timing controller 110 can, by means of the control packets CLP, determine the timing at which the source drivers 120_1~120_6 output the pixel voltages Vp.

The timing controller 110 outputs the color data packets DAP to the source drivers 120_1~120_6, and the source drivers 120_1~120_6 output the pixel voltages Vp based on the color data packets DAP received by the source drivers 120_1~120_6. Thereby, the source drivers 120_1~120_6 and the timing controller 110 can be synchronously operated in no need of clock signals, and the number of the pins of the source drivers 120_18 120_6 and the timing controller 110 can be reduced. Further, the hardware costs of the source drivers 120_1~120_6 and the timing controller 110 can be lowered down.

Figure 3:
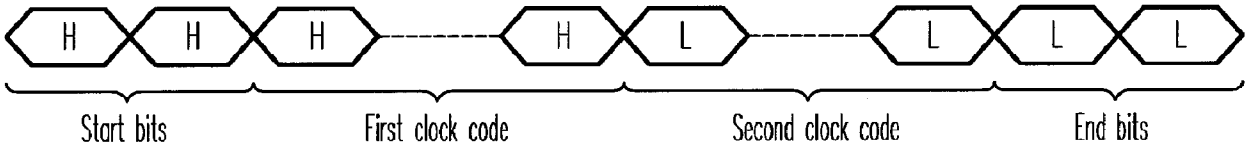
FIG. 3 is a schematic view illustrating the training packets depicted in FIG. 2 according to an embodiment of the invention.

FIG. 3 is a schematic view illustrating the training packets depicted in FIG. 2 according to an embodiment of the invention. With reference to FIG. 3, in this embodiment, each of the training packets TRP includes two start bits, two end bits, a first clock code, and a second clock code. The bit number of the first clock code is equal to the bit number of the first clock code. The first clock code is located between the start bits and the second clock code, and the second clock code is located between the first clock code and the end bits. Here, the start bits and the bits of the first clock code respectively correspond to a logic high level H, and the end bits and the bits of the second clock code respectively correspond to a logic low level L, such that the training packets TRP are logically equal to a pulse of the clock signal.

Figure 4:
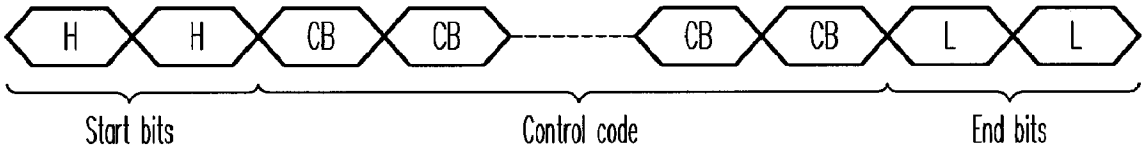
FIG. 4 is a schematic view illustrating the control packets depicted in FIG. 2 according to an embodiment of the invention.

FIG. 4 is a schematic view illustrating the control packets depicted in FIG. 2 according to an embodiment of the invention. With reference to FIG. 4, in this embodiment, each of the control packets CLP includes two start bits, two end bits, and a control code located between the start bits and the end bits. The control code is constituted by a plurality of control data bits CB. Besides, the start bits respectively correspond to a logic high level H, and the end bits respectively correspond to a logic low level L.

Figure 5:
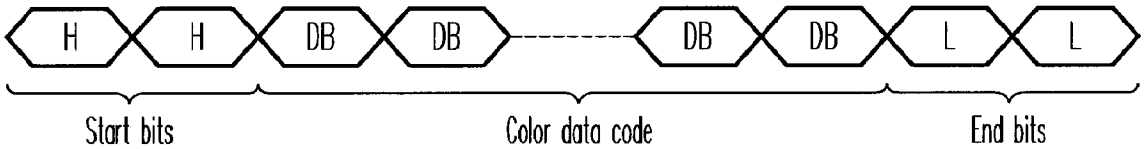
FIG. 5 is a schematic view illustrating the color data packets depicted in FIG. 2 according to an embodiment of the invention.

FIG. 5 is a schematic view illustrating the color data packets depicted in FIG. 2 according to an embodiment of the invention. With reference to FIG. 2, in the embodiment of the invention, each of the color data packets DAP includes two start bits, two end bits, and a color data code located between the start bits and the end bits. The color data code is constituted by a plurality of color data bits DB. The start bits respectively correspond to the logic high level H, and the end bits respectively correspond to the logic low level L.

In this embodiment, the color data code corresponds to two of red color data, green color data, and blue color data, or the color data code corresponds to one of red color data, green color data, and blue color data. People having ordinary skill in the art may make modifications accordingly.

Besides, in this embodiment, the packet size of the training packets TRP, the control packets CLP, and the color data packets DAP is the same (i.e., the bit number of these packets is the same). If each of the color data is assumed to be 10 bits, and the color data code corresponds to two of the red color data, the green color data, and the blue color data, the training packets TRP, the control packets CLP, and the color data packets DAP are 24 bits (i.e., 2+10+10+2). If each of the color data is assumed to be 10 bits, and the color data code corresponds to one of the red color data, the green color data, and the blue color data, the training packets TRP, the control packets CLP, and the color data packets DAP are 14 bits (i.e., 2+10+2).

If each of the color data is assumed to be 8 bits, and the color data code corresponds to two of the red color data, the green color data, and the blue color data, the training packets TRP, the control packets CLP, and the color data packets DAP are 20 bits (i.e., 2+8+8+2). If each of the color data is assumed to be 8 bits, and the color data code corresponds to one of the red color data, the green color data, and the blue color data, the training packets TRP, the control packets CLP, and the color data packets DAP are 12 bits (i.e., 2+8+2).

If each of the color data is assumed to be 6 bits, and the color data code corresponds to two of the red color data, the green color data, and the blue color data, the training packets TRP, the control packets CLP, and the color data packets DAP are 16 bits (i.e., 2+6+6+2). If each of the color data is assumed to be 6 bits, and the color data code corresponds to one of the red color data, the green color data, and the blue color data, the training packets TRP, the control packets CLP, and the color data packets DAP are 10 bits (i.e., 2+6+2).

Figure 6:
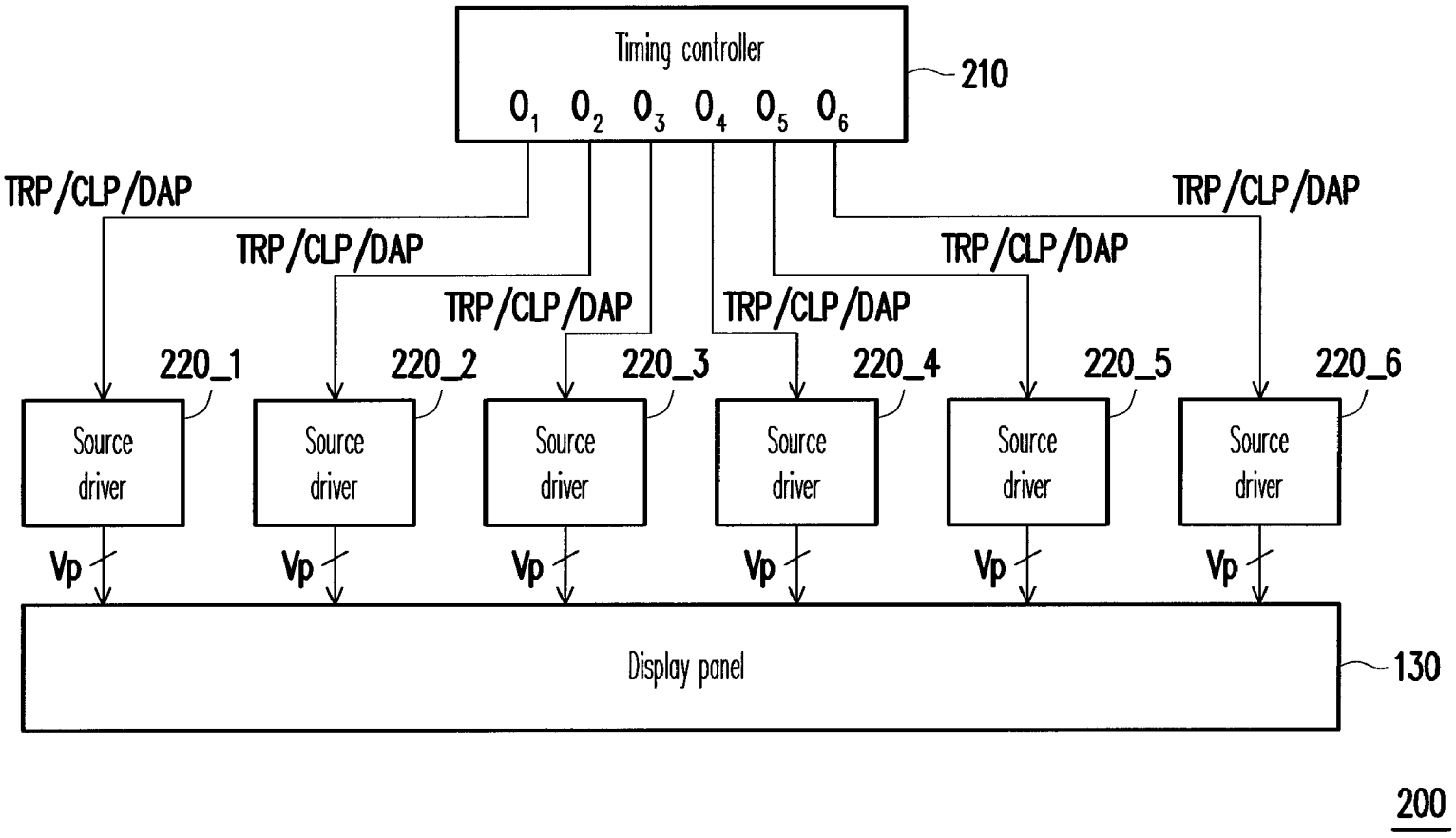
FIG. 6 is a schematic view illustrating a system of a display according to another embodiment of the invention.

FIG. 6 is a schematic view illustrating a system of a display according to another embodiment of the invention. With reference to FIG. 1 and FIG. 6, the difference therebetween lies in the timing controller 210 and the source drivers 220_1~220_6 of the display 200 in this embodiment. The source drivers 220_1~220_6 pull down the voltage levels of the signal output terminals (e.g., the signal output terminals $O_1$~$O_6$) of the timing controller 210 to the ground voltage (i.e., the predetermined voltage) when the source drivers 220_1~220_6 do not lock the clock of the timing controller 210. Namely, when the voltage level of the signal output terminal $O_1$ of the timing controller 210 is pulled down to the ground voltage, it indicates that the source driver 220_1 does not lock the clock of the timing controller 210; when the voltage level of the signal output terminal $O_2$ of the timing controller 210 is pulled down to the ground voltage, it indicates that the source driver 220_2 does not lock the clock of the timing controller 210; the rest can be deduced from the above.

In addition, when one of the source drivers 220_1~220_6 does not lock the clock of the timing controller 210, the timing controller 210 again transmits the training packets TRP to the source drivers 220_1~220_6, such that the source drivers 220_1~220_6 can lock the clock of the timing controller 210 based on the training packets TRP received by the source drivers 220_1~22_6, respectively. Alternatively, the timing controller 210 can again transmit the training packets TRP to the source drivers (e.g., the source drivers 220_1~220_6) that do not lock the clock of the timing controller 210, such that the source drivers 220_1~22_6 can once again lock the clock of the timing controller 210 based on the training packets TRP.

Figure 7:
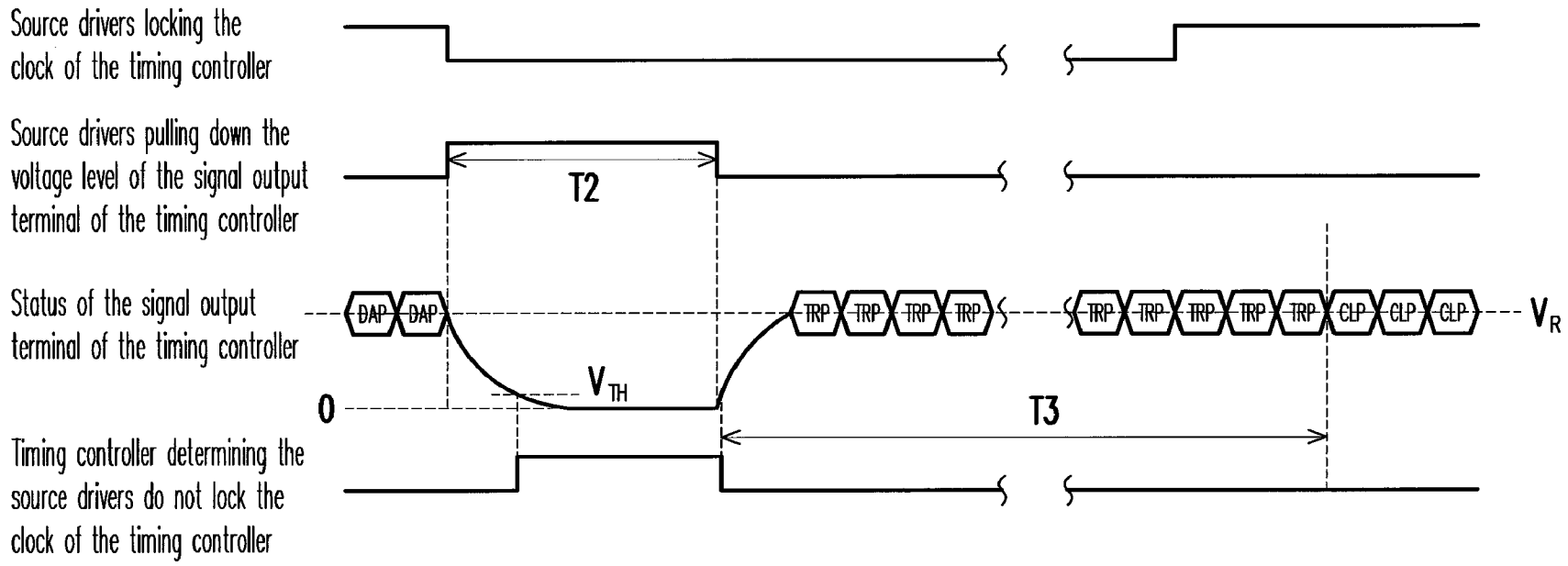
FIG. 7 is a schematic timing diagram illustrating that the source drivers depicted in FIG. 6 pull down voltage levels of signal output terminals of the timing controller according to an embodiment of the invention.

FIG. 7 is a schematic timing diagram illustrating that the source drivers depicted in FIG. 6 pull down voltage levels of signal output terminals of the timing controller according to an embodiment of the invention. With reference to FIG. 7, in this embodiment, the timing controller 210 transmits the training packets TRP, the control packets CLP, or the color data packets DAP by the differential signal. Therefore, the voltage levels of the signal output terminals (e.g., the signal output terminals $O_1$~$O_6$) oscillate along a reference voltage $V_R$. In most cases, the reference voltage $V_R$ is far greater than the ground voltage.

When the timing controller 210 does not detect any source driver (e.g., any of the source drivers 220_1~220_6) that does not lock the clock of the timing controller 210, the timing controller 210 outputs the control packets CLP or the color data packets DAP to the source drivers 220_1~220_6. If the source drivers (e.g., the source drivers 220_1~220_6) cannot correctly receive the control packets CLP or the color data packets DAP (i.e., the clock of the timing controller 210 is not locked, which is shown as a logic low level), the source drivers (e.g., the source drivers 220_1~220_6) pull down the voltage levels of the signal output terminals (e.g., the signal output terminals $O_1$~$O_6$) of the timing controller 210 to the ground voltage (shown as the logic high level) for the first period of time (i.e., in the period T2). The period T2 is greater than or equal to the time required for pulling down the voltage levels of the signal output terminals (e.g., the signal output terminals $O_1$~$O_6$) of the timing controller 210 to the ground voltage. In an embodiment, the period T2 is greater than or substantially equal to 350 nano-seconds.

When the timing controller 210 detects that the voltage levels of one or more of the signal output terminals (e.g., the signal output terminals $O_1$~$O_6$) of the timing controller 210 are lower than or equal to a threshold voltage $V_{TH}$, the timing controller 210 determines one or more of the source drivers (e.g., the source drivers 220_1~220_6) do not lock the clock of the timing controller 210. Here, the threshold voltage $V_{TH}$ can be less than or substantially equal to 0.4V. When the source drivers (e.g., the source drivers 220_1~220_6) stop pulling down the voltage levels of the signal output terminals (e.g., the signal output terminals $O_1$~$O_6$) of the timing controller 210, i.e., when the voltage levels of the corresponding signal output terminals (e.g., the signal output terminals $O_1$~$O_6$) are greater than the threshold voltage $V_{TH}$, the timing controller 210 outputs the training packets TRP to the source drivers (e.g., the source drivers 220_1~220_6) for the second period of time (i.e., in the period T3). The period T3 is greater than or equal to the time required by the source drivers (e.g., the source drivers 220_1~220_6) for locking the clock of the timing controller 210. According to an embodiment of the invention, the period T3 is greater than or substantially equal to 1500 times a packet time, and the packet time is a time frame required for transmitting the training packets TRP, the control packets CLP, or the color data packets DAP.

If the data rate is 600M bps, and each packet size is 20 bits, then the period T3≥50 μs (i.e., 1500×20/600M). If the data rate is 200M bps, and each packet size is 20 bits, then the period T3≥150 μs (i.e., 1500×20/200M).

Figure 8A:
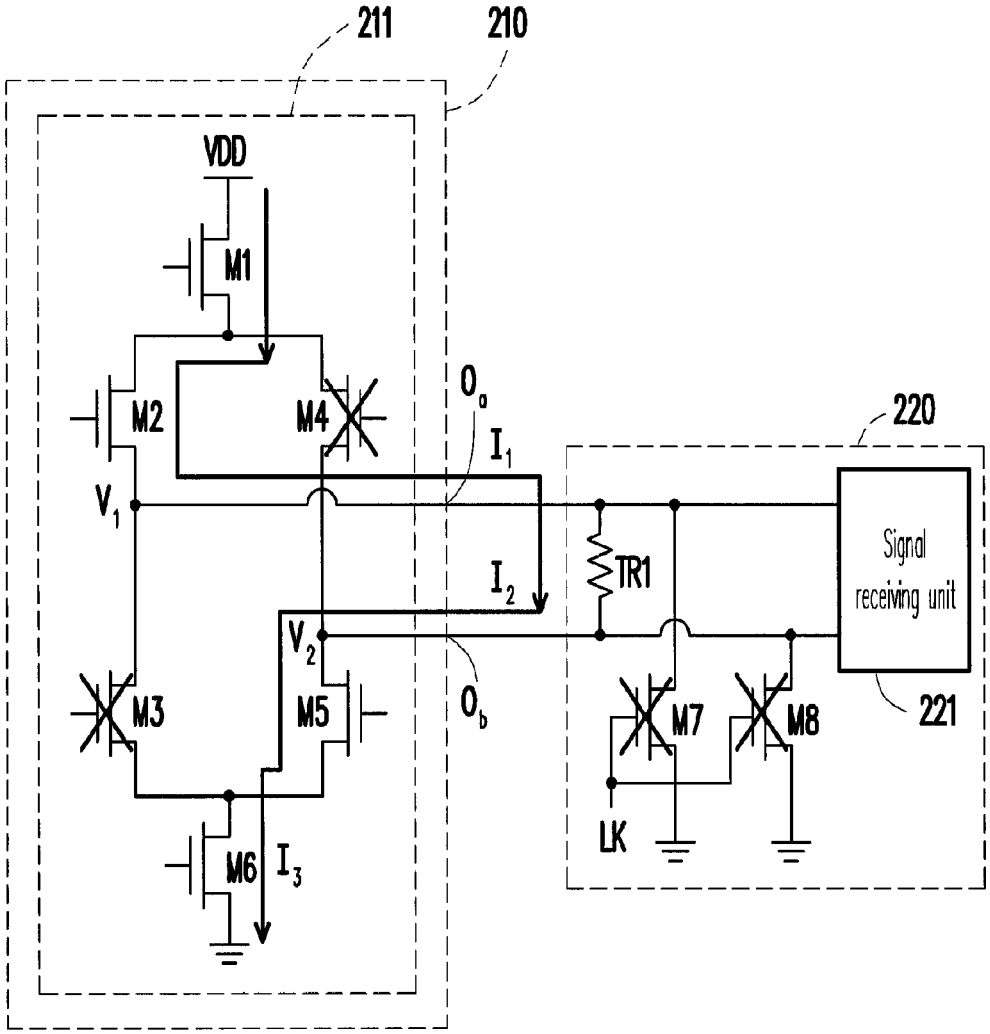
FIG. 8A and FIG. 8B are schematic circuit diagrams illustrating the output of the timing controller depicted in FIG. 6 at a logic high level and a logic low level according to an embodiment of the invention.
Figure 8B:
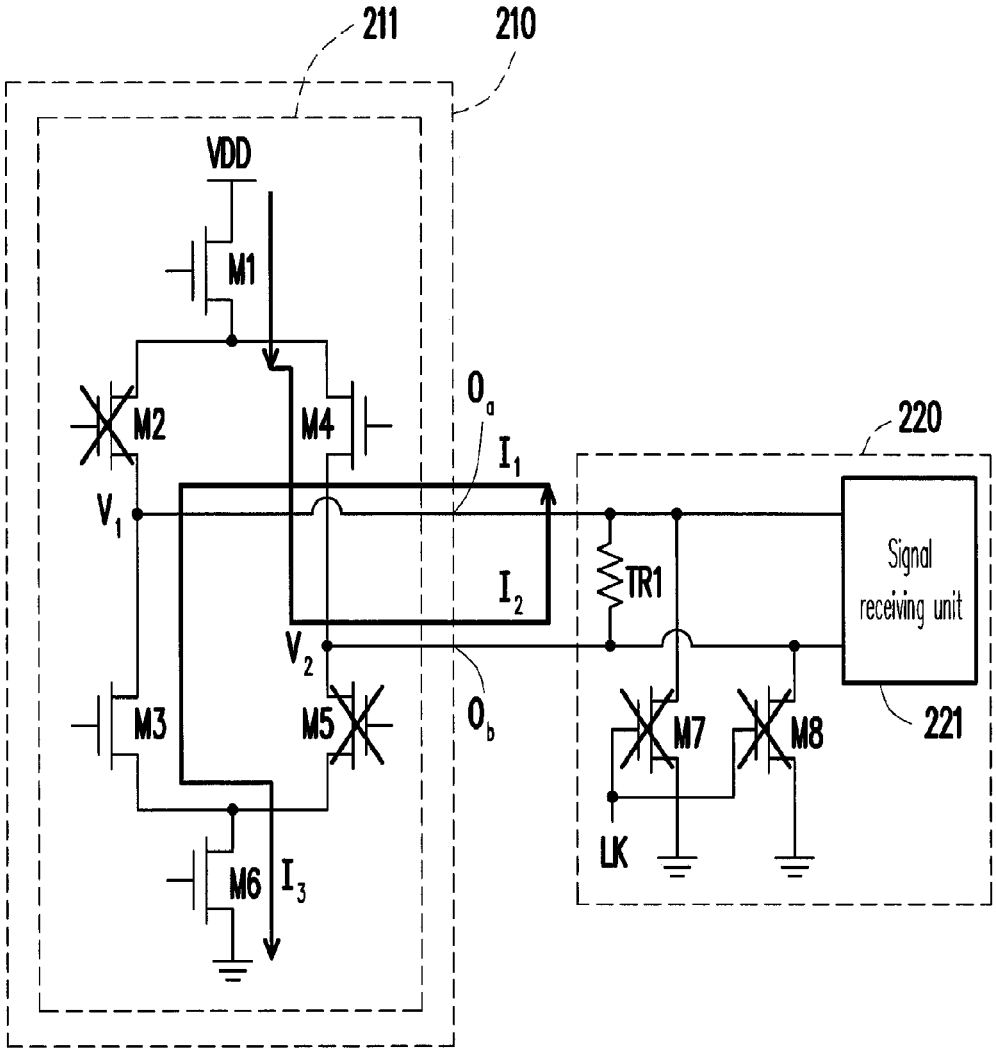

FIG. 8A and FIG. 8B are schematic circuit diagrams illustrating the output of the timing controller depicted in FIG. 6 at a logic high level and a logic low level according to an embodiment of the invention. With reference to FIG. 8A and FIG. 8B, in this embodiment, the timing controller 210 includes a differential signal generating circuit 211, and the source driver 220 includes a first switch (e.g., a transistor M7 herein), a second switch (e.g., a transistor M8 herein), a terminal resistor TR1, and a signal receiving unit 211. The differential signal generating circuit 211 includes transistors M1~M6, and the timing controller 210 outputs the differential signal via the signal output terminal $O_a$ (i.e., the first signal output terminal) and the signal output terminal $O_b$ (i.e., the second signal output terminal).

The drain of the transistor M1 is coupled to a system voltage VDD, and the source of the transistor M1 is coupled to the drains of the transistors M2 and M4. The source of the transistor M2 is coupled to the drain of the transistor M3. The source of the transistor M4 is coupled to the drain of the transistor M5. The drain of the transistor M6 is coupled to the sources of the transistors M3 and M5, and the source of the transistor M6 is coupled to a ground point. The drain (i.e., the first end) of the transistor M7 is coupled to the signal output terminal $O_a$, the source (i.e., the second end) of the transistor M7 is coupled to the ground point, and the gate (i.e., the control end) of the transistor M7 receives a lock signal LK. The drain (i.e., the first end) of the transistor M8 is coupled to the signal output terminal $O_b$, the source (i.e., the second end) of the transistor M8 is coupled to the ground point, and the gate (i.e., the control end) of the transistor M8 receives the lock signal LK. The lock signal LK can be generated by the signal receiving unit 221 or by other detection circuits in the source driver 220 based on the state of the received packets. The terminal resistor TR1 is coupled between the signal output terminal $O_a$ and the signal output terminal $O_b$. Moreover, the waveform of the lock signal LK can be referred to the waveform of source drivers pulling down the voltage level of the signal output terminal of the timing controller depicted in FIG. 7.

Since the source driver 220 is assumed to lock the clock of the timing controller 210, the source driver 220 does not pull down the voltage levels of the signal output terminals $O_a$ and $O_b$. At this time, the lock signal LK is disabled, such that the transistors M7 and M8 are not turned on.

With reference to FIG. 8A, when the timing controller 210 outputs the differential signal indicating the logic high level, the transistors M1, M2, M5, and M6 are turned on, while the transistors M3 and M4 are not. The current flows to the ground point through the turned-on transistors M1 and M2, the terminal resistor TR1, and the turned-on transistors M5 and M6. Here, the current $I_1$ (i.e., the first current) flowing from the signal output terminal $O_a$, the current $I_2$ (i.e., the second current) flowing to the signal output terminal $O_b$, and the current $I_3$ (i.e., the third current) flowing to the ground point through the turned-on transistor M6 are substantially identical. Here, since the voltage $V_1$ is greater than the voltage $V_2$, the signal receiving unit 221 detects the positive voltage difference and thus determines the timing controller 210 logically outputs the logic high level.

With reference to FIG. 8B, when the timing controller 210 outputs the differential signal indicating logic low level, the transistors M1, M3, M4, and M6 are turned on, while the transistors M2 and M5 are not. The current flows to the ground point through the turned-on transistors M1 and M4, the terminal resistor TR1, and the turned-on transistors M3 and M6. Here, the current $I_1$ (i.e., the first current) flowing to the signal output terminal $O_a$, the current $I_2$ (i.e., the second current) flowing from the signal output terminal $O_b$, and the current $I_3$ (i.e., the third current) flowing to the ground point through the turned-on transistor M6 are substantially identical. Here, since the voltage $V_2$ is greater than the voltage $V_1$, the signal receiving unit 221 detects the negative voltage difference and thus determines the timing controller 210 logically outputs the logic low level.

Figure 9:
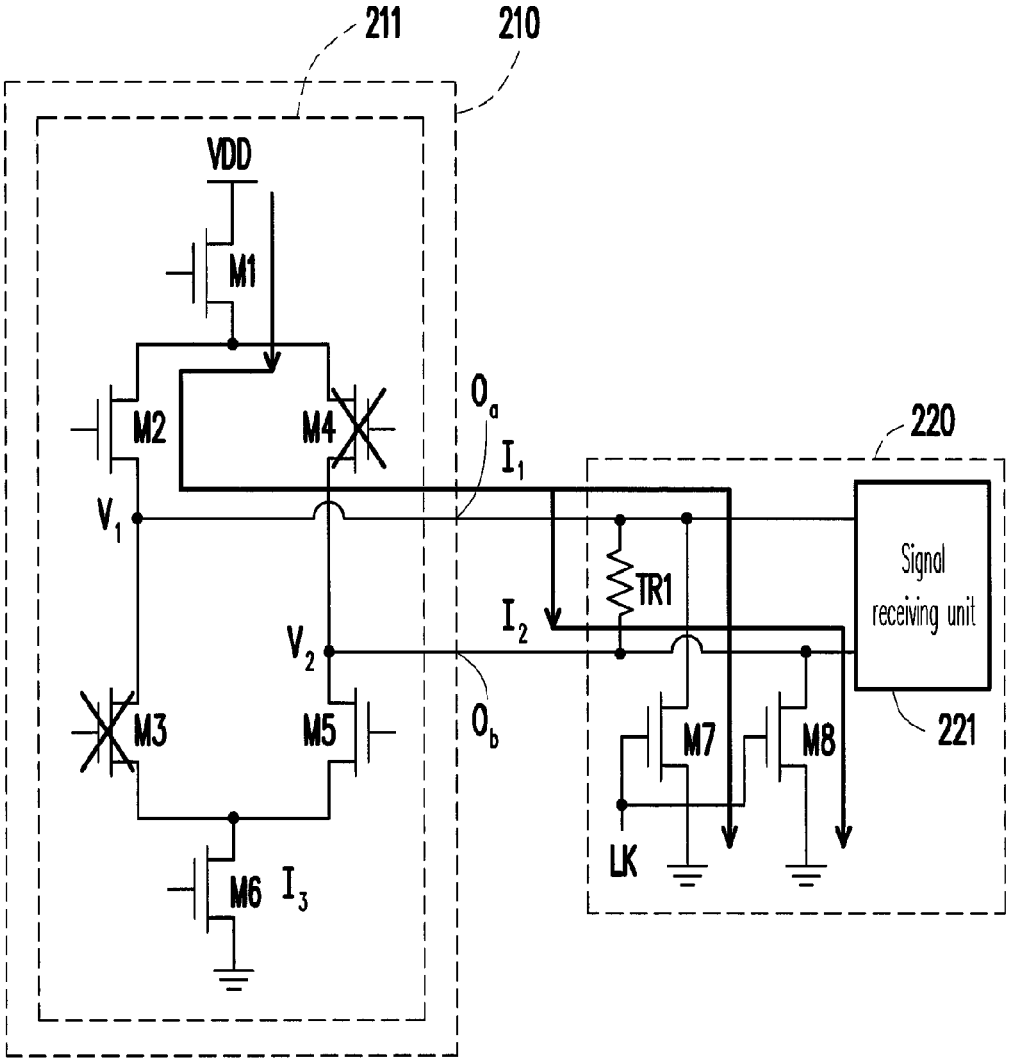
FIG. 9 is a schematic diagram illustrating circuit operations when the source drivers depicted in FIG. 6 pull down voltage levels of the signal output terminals of the timing controller according to an embodiment of the invention.

FIG. 9 is a schematic diagram illustrating circuit operations when the source drivers depicted in FIG. 6 pull down voltage levels of the signal output terminals of the timing controller according to an embodiment of the invention. As indicated in FIG. 9, it is assumed the source driver 220 does not lock the clock of the timing controller 210, and thus the source driver 220 pulls down the voltage levels of the signal output terminals $O_a$ and $O_b$. At this time, the lock signal LK is enabled, such that the transistors M7 and M8 are turned on.

Here, the timing controller 210 logically outputs the logic high level, for instance; therefore, the transistors M1, M2, M5, and M6 are turned on, while the transistors M3 and M4 are not. However, the current flows to the ground point through the turned-on transistors M1 and M2, the terminal resistor TR1, and the turned-on transistors M7 and M8. Accordingly, the voltages $V_1$ and $V_2$ are pulled down to the ground voltage, such that the common mode voltage (i.e., the average of the voltages $V_1$ and $V_2$) of the differential signal is pulled down to the ground voltage. Besides, the current $I_2$ flowing to the signal output terminal $O_b$ and the current $I_3$ flowing to the ground point through the turned-on transistor M6 are substantially zero.

Similarly, when the timing controller 210 logically outputs the logic low level, and the voltage levels of the signal output terminals $O_a$ and $O_b$ are pulled down, the common mode voltage of the differential signal is also pulled down to the ground voltage. Additionally, the current $I_1$ flowing to the signal output terminal $O_a$ and the current $I_3$ flowing to the ground point through the turned-on transistor M6 are substantially zero.

In view of the foregoing, the timing controller 210 can detect the common mode voltage of the differential signal. When the common mode voltage is the ground voltage, the timing controller 210 determines that the voltage levels of the first signal output terminal $O_a$ and the second signal output terminal $O_b$ are pulled down to the ground voltage. The timing controller 210 can also detect the currents $I_1$ and $I_2$ at the signal output terminals $O_a$ and $O_b$. When one of the currents $I_1$ and $I_2$ is substantially zero, the timing controller 210 determines that the voltage levels of the signal output terminals $O_a$ and $O_b$ are pulled down to the ground voltage. Moreover, the timing controller 210 can detect the current $I_3$ flowing to the ground point through the turned-on transistor M6 (i.e., the current $I_3$ output to the ground point by the differential signal generating circuit 211). When the current $I_3$ is substantially zero, the timing controller 210 determines that the voltage levels of the signal output terminals $O_a$ and $O_b$ are pulled down to the ground voltage.

Figure 10:
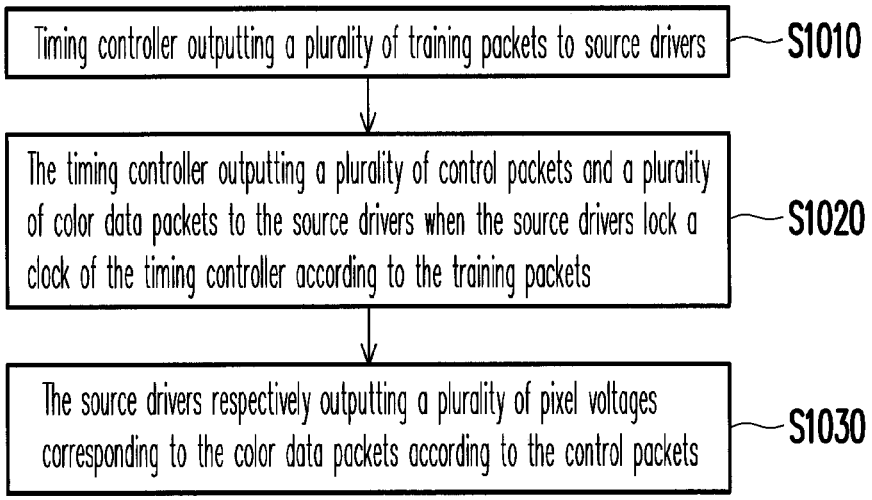
FIG. 10 is a flowchart illustrating an operating method of a display according to an embodiment of the invention.

FIG. 10 is a flowchart illustrating an operating method of a display according to an embodiment of the invention. With reference to FIG. 10, the display of this embodiment includes a timing controller and a plurality of source drivers. The timing controller outputs a plurality of training packets to the source drivers (step S1010). When the source drivers lock a clock of the timing controller according to the training packets, the timing controller outputs a plurality of control packets and a plurality of color data packets to the source drivers (step S1020). Here, the training packets, the control packets, and the color data packets are serially transmitted to the source drivers. The source drivers respectively output a plurality of pixel voltages corresponding to the color data packets according to the control packets (step S1030). The above-mentioned order of performing said steps is exemplary and should not be construed as a limitation to the invention. The detailed steps can be referred to as those described above with respect to the displays 100 and 200 and thus are not reiterated herein.

To sum up, in the display and the operating method thereof described in the embodiments of the invention, the timing controller and the source drivers are synchronously operated due to the training packets. Hence, the timing controller and the source drivers are synchronously operated in no need of the clock signals, and the hardware costs of the timing controller and the source drivers can be lowered down. Further, the source drivers pull down the voltage levels of the signal output terminals when the source drivers do not lock the clock of the timing controller, so as to reduce pins of output signals and lower down the hardware costs of the timing controller and the source drivers.

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

What is claimed is:

1. A display comprising:

a display panel;

a timing controller having a plurality of signal output terminals; and a plurality of source drivers coupled to the timing controller and the display panel, wherein the timing controller outputs a plurality of training packets to the source drivers, when the source drivers lock a clock of the timing controller based on the training packets, the timing controller outputs a first start signal packet, a plurality of control packets, a second start signal packet, and a plurality of color data packets in order to the source drivers, and the source drivers [respectively output a plurality of pixel voltages corresponding to the color data packets to] *drive* the display panel based on *the color data packets and* the [corresponding] control packets, the training packets, the control packets, and the color data packets being serially transmitted by a differential signal to the source drivers via the signal output terminals, the differential signal is outputted through a first signal output terminal and a second signal output terminal of the signal output terminals, the first start signal packet informs the source drivers of starting transmission of the control packets, the control packets set an operational mode or parameters of the source drivers, the second start signal packet informs the source drivers of starting transmission of the color data packets, and the color data packets set [pixel] voltages [provided by the source drivers] *providing to the display panel*, when the clock of the timing controller is not locked, each of the source drivers pulls down voltage levels of the corresponding first signal output terminal and the corresponding second signal output terminal to a predetermined voltage for a first period of time at the same time, and the predetermined voltage is lower than a threshold voltage, wherein the predetermined voltage is a ground voltage, and each of the source drivers comprises:

a first switch, [a first end of the first switch being] coupled [to] *between* the first signal output terminal[, a second end of the first switch being coupled to] *and* the predetermined voltage, [a control end of the first switch] *and* receiving a lock signal; and a second switch, [a first end of the second switch being] coupled [to] *between* the second signal output terminal[, a second end of the second switch being coupled to] *and* the predetermined voltage, [a control end of the second switch] *and* receiving the lock signal, wherein the lock signal is enabled when the clock of the timing controller is not locked, and the lock signal is disabled when the clock of the timing controller is locked.

2. The display as recited in claim 1, wherein the first period of time is greater than or equal to 350 nano-seconds.

3. The display as recited in claim 1, wherein the timing controller detects a common mode voltage of the differential signal, and the timing controller determines that a voltage level of the first signal output terminal and a voltage level of the second signal output terminal are pulled down to the predetermined voltage when the common mode voltage is the predetermined voltage.

4. The display as recited in claim 1, wherein the timing controller detects a first current and a second current at the first signal output terminal and the second signal output terminal, and the timing controller determines that a voltage level of the first signal output terminal and a voltage level of the second signal output terminal are pulled down to the predetermined voltage when one of the first current and the second current is zero.

5. The display as recited in claim 1, wherein the timing controller detects a third current output to a ground point by a differential signal generating circuit outputting the differential signal, and the timing controller determines that a voltage level of the first signal output terminal and a voltage level of the second signal output terminal are pulled down to the predetermined voltage when the third current is zero.

6. The display as recited in claim 1, wherein the timing controller outputs the training packets to the source drivers for a second period of time when one of the source drivers does not lock the clock of the timing controller.

7. The display as recited in claim [1] *6*, wherein the second period of time is greater than or equal to 1500 times a packet time, and the packet time is a time period required for transmitting one of the training packets, the control packets, or the color data packets.

8. The display as recited in claim 1, wherein each of the control packets comprises two start bits, two end bits, and a control code located between the start bits and the end bits.

9. The display as recited in claim 8, wherein the start bits respectively correspond to a logic high level, and the end bits respectively corresponding to a logic low level.

10. The display as recited in claim 1, wherein each of the color data packets comprises two start bits, two end bits, and a color data code located between the start bits and the end bits.

11. The display as recited in claim 10, wherein the color data code corresponds to two of red color data, green color data, and blue color data.

12. The display as recited in claim 10, wherein the color data code corresponds to one of red color data, green color data, and blue color data.

13. The display as recited in claim 10, wherein the start bits respectively correspond to a logic high level, and the end bits respectively corresponding to a logic low level.

14. The display as recited in claim 1, wherein each of the training packets comprises two start bits, two end bits, a first clock code, and a second clock code, the first clock code is located between the start bits and the second clock code, and the second clock code is located between the first clock code and the end bits.

15. The display as recited in claim 14, wherein the start bits and a plurality of bits of the first clock code respectively correspond to a logic high level, and the end bits and a plurality of bits of the second clock code respectively correspond to a logic low level.

16. The display as recited in claim 1, wherein the source drivers lock the clock of the timing controller based on phase comparison.

17. An operating method of a display, the display comprising a timing controller and a plurality of source drivers, the operating method comprising:

outputting a plurality of training packets to the source drivers by using the timing controller;

outputting a first start signal packet, a plurality of control packets, a second start signal packet, and a plurality of color data packets in order to the source drivers by using the timing controller [when the source drivers lock] *in response to* a clock of the timing controller *being locked* according to the training packets, wherein the first start signal packet informs the source drivers of starting transmission of the control packets, the control packets set an operational mode or parameters of the source drivers, the second start signal packet informs the source drivers of starting transmission of the color data packets, and the color data packets set [pixel] voltages [provided by the source drivers] *providing to the display panel*;

[respectively outputting a plurality of pixel voltages corresponding to the color data packets] *driving the dis-*

*play panel* according to *the color data packets and* the control packets by using the source drivers, wherein the training packets, the control packets, and the color data packets are serially transmitted by a differential signal to the source drivers, and the differential signal is outputted through a first signal output terminal and a second signal output terminal; and

[when] *in response to* the clock of the timing controller [is] not *being* locked, each of the source drivers pulls down voltage levels of the corresponding first signal output terminal and the corresponding second signal output terminal to a predetermined voltage for a first period of time at the same time, and the predetermined voltage is lower than a threshold voltage, wherein the predetermined voltage is a ground voltage.

18. The operating method as recited in claim 17, wherein the first period of time is greater than or equal to 350 nanoseconds.

19. The operating method as recited in claim 18, wherein the timing controller outputs the training packets to the source drivers for a second period of time when one of the source drivers does not lock the clock of the timing controller.

20. The operating method as recited in claim 19, wherein the second period of time is greater than or equal to 1500 times a packet time, and the packet time is a time period required for transmitting one of the training packets, the control packets, or the color data packets.

* * * * *